United States Patent
Brunemann et al.

(10) Patent No.: US 7,463,962 B2
(45) Date of Patent: Dec. 9, 2008

(54) SHIFT POINT STRATEGY FOR HYBRID ELECTRIC VEHICLE TRANSMISSION

(75) Inventors: George A. Brunemann, Cincinnati, OH (US); Larry J. Brackney, Columbus, IN (US)

(73) Assignee: Eaton Corporation, Cleveland, OH (US)

( * ) Notice: Subject to any disclaimer, the term of this patent is extended or adjusted under 35 U.S.C. 154(b) by 146 days.

(21) Appl. No.: 11/176,409

(22) Filed: Jul. 7, 2005

(65) Prior Publication Data

US 2006/0006008 A1 Jan. 12, 2006

Related U.S. Application Data

(60) Provisional application No. 60/585,896, filed on Jul. 7, 2004.

(51) Int. Cl.
*G06F 7/00* (2006.01)
*B60W 10/10* (2006.01)

(52) U.S. Cl. .................. 701/55; 701/58; 180/65.7

(58) Field of Classification Search .............. 701/51, 701/55, 56, 58, 60, 61; 180/65.6, 65.7; 192/3.51, 192/3.61; 903/902, 909, 917, 919, 945
See application file for complete search history.

(56) References Cited

U.S. PATENT DOCUMENTS

| | | | |
|---|---|---|---|
| 5,477,452 A | 12/1995 | Milunas et al. | |
| 5,688,207 A | 11/1997 | Uchida et al. | |
| 5,913,916 A | 6/1999 | Bai et al. | |
| 6,315,068 B1 * | 11/2001 | Hoshiya et al. | ............ 180/65.2 |
| 2001/0003807 A1 * | 6/2001 | Lee | ............... 701/51 |
| 2002/0189397 A1 * | 12/2002 | Sakamoto et al. | ............. 74/661 |
| 2003/0000751 A1 | 1/2003 | Denton et al. | |
| 2003/0216847 A1 * | 11/2003 | Bellinger | ............... 701/51 |

FOREIGN PATENT DOCUMENTS

| | | |
|---|---|---|
| DE | 19501315 | 4/1996 |
| DE | 4440706 | 5/1996 |
| DE | 19511866 | 10/1996 |
| EP | 0634591 | 1/1995 |
| EP | 1356972 | 10/2003 |

OTHER PUBLICATIONS

International Search Report for PCT/US2005/024091.
English Abstract for DE-19511866.
English Abstract for DE-19501315.
English Abstract for EP-0634591.
English Abstract for DE-4440706.

\* cited by examiner

*Primary Examiner*—Jack W Keith
*Assistant Examiner*—Edward Pipala
(74) *Attorney, Agent, or Firm*—Rader, Fishman & Grauer PLLC

(57) ABSTRACT

A method for determining a shift point strategy in a hybrid vehicle includes providing at least two power sources, selectively coupling the two or more power sources to a hybrid vehicle transmission, defining an input shaft speed for best acceleration, defining an input shaft speed for best fuel economy, determining driver intent compared to the best acceleration and the best fuel economy, and setting a shift point of the hybrid vehicle transmission based, at least in part, on the driver intent.

20 Claims, 4 Drawing Sheets

SHIFT POINT STRATEGY FOR HYBRID ELECTRIC VEHICLE TRANSMISSION

RELATED APPLICATION

The present application claims priority to the provisional application entitled, "Shift Point Strategy for Hybrid Electric Vehicle Transmission," Ser. No. 60/585,896, filed on Jul. 7, 2004, which application is incorporated by reference herein in its entirety.

BACKGROUND

The present system and method relate generally to hybrid motor vehicles, and more particularly, to a system and method for establishing a shift point strategy in a hybrid motor vehicle.

Automobile manufacturers are constantly working to improve fuel efficiency in motor vehicles. Improvements in fuel efficiency are typically directed toward reducing weight, improving aerodynamics, modifying power inputs, and reducing power losses through the vehicle powertrain. However, the need to improve fuel efficiency is commonly offset by demands to provide enhanced comfort, power, and convenience to the vehicle operator. As an example, manually-shifted transmissions are more fuel efficient than automatic transmissions due to lower parasitic losses. However, a vast majority of domestic motor vehicles, for example, are equipped with automatic transmissions due to the increased operator convenience they provide.

In motor vehicles equipped with automatic transmissions, adjustments may be made to the timing of the gear shifts to vary the vehicle's fuel consumption characteristics, acceleration characteristics, and the like. Traditionally, a gear shift schedule map used in the control apparatus for the automatic transmission is determined at developing stage of a vehicle to establish shift points of a transmission based on the fuel consumption and acceleration characteristics of the engine. According to this method, it is possible to control the shift characteristics of the transmission in real time with a computer having a slow calculating speed since data necessary for control can be read out from the gear shift schedule map.

However, in recent times, vehicle manufacturers have been working to develop "hybrid" electric vehicles, which include an internal combustion engine and an electric or hydraulic motor, to provide a reduced level of pollutants when compared to traditional internal combustion engines. The ability of the recently developed hybrid electric vehicles to use one or both of the motor and the engine presents a number of issues for the development of a transmission shift point strategy. More specifically, formation of a pre-determined shift-point map is more difficult with hybrid vehicles due to the uncertainty introduced by often having multiple inputs providing torque to a vehicle driveline.

SUMMARY

A method for determining a shift point strategy in a hybrid vehicle includes providing at least two power sources, selectively coupling the two or more power sources to a hybrid vehicle transmission, defining an input shaft speed for best acceleration, defining an input shaft speed for best fuel economy, determining driver intent compared to the best acceleration and the best fuel economy, and setting a shift point of the hybrid vehicle transmission based, at least in part, on the driver intent.

An exemplary system for determining a shift point strategy in a hybrid vehicle transmission includes an electric control unit configured to define a speed of the hybrid transmission input shaft for best acceleration, define a speed of the transmission input shaft for best fuel economy, determine driver intent in comparison to the best acceleration and the best fuel economy based in part at least on driver demand torque as a fraction of total available torque, and set a shift point based in part on at least the determining step.

BRIEF DESCRIPTION OF THE DRAWINGS

Embodiments of the present system and method will now be described, by way of example, with reference to the accompanying drawings, wherein.

Throughout the drawings, identical reference numbers designate similar, but not necessarily identical, elements.

DETAILED DESCRIPTION

Figure 1:
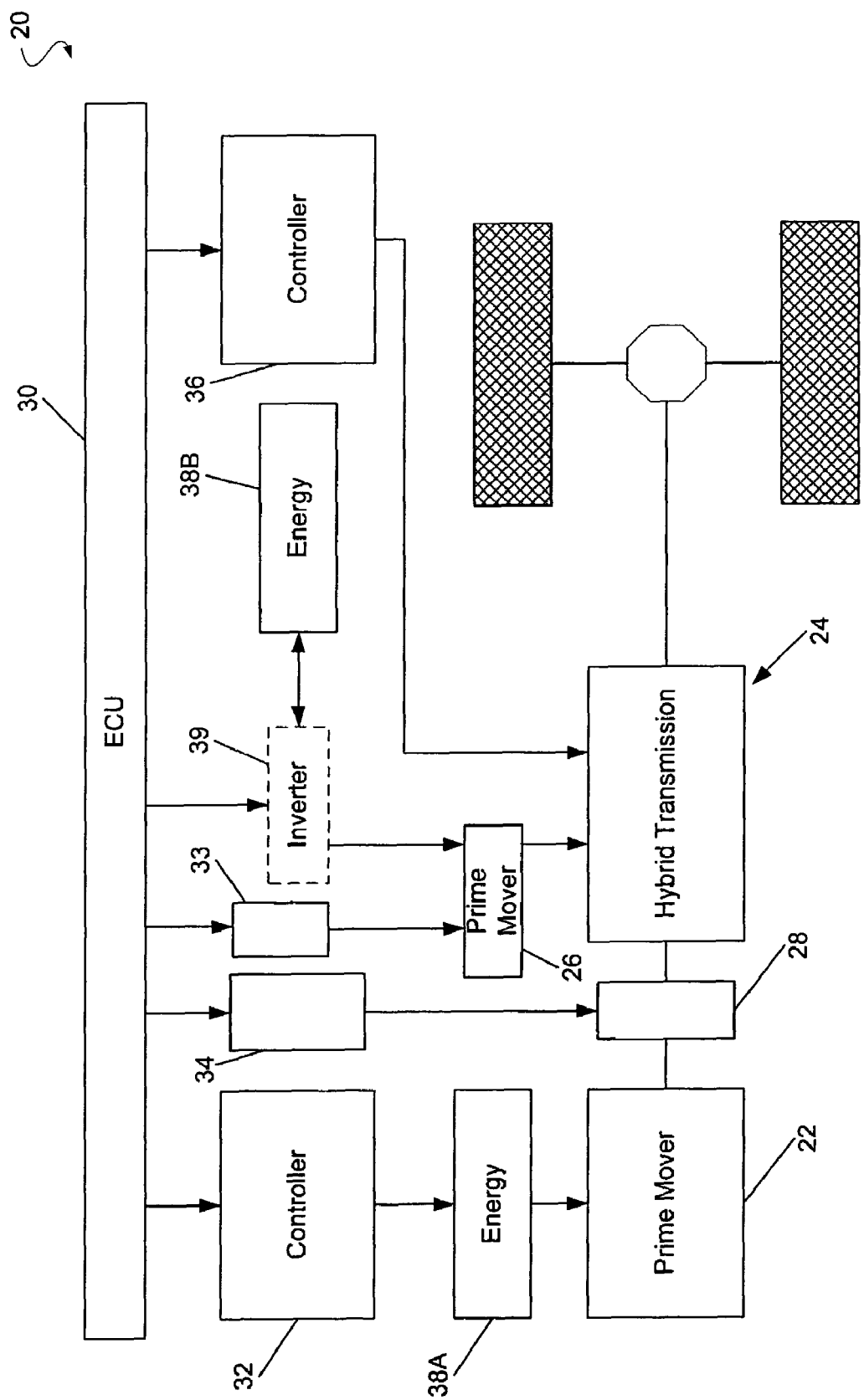
FIG. 1 is a schematic view of a hybrid powertrain system for a motor vehicle.

Referring to FIG. 1, a hybrid powertrain system (20) is shown in accordance with an embodiment of the present system and method. In the illustrated embodiment, the powertrain system (20) includes a first prime mover (22), such as a spark-ignited or compression-ignited internal combustion engine, and a hybrid transmission (24) that includes a second prime mover (26), such as an electric motor/generator or hydraulic motor/pump. A main synchronizing clutch (28) is positioned between first prime mover (22) and hybrid transmission (24) to selectively engage/disengage the first prime mover (22) from the hybrid transmission (24). The main synchronizing clutch (28) may be any number of clutches currently known in the art such as a hydraulically or electrically operated friction clutch. As used in the present specification, and in the appended claims, the term "engaged," when mentioned with respect to a clutch, is meant to be understood as resulting in a single or bi-directional clutching action. Similarly, operation in a "disengaged" mode is meant to be understood as permitting freewheeling by transmission elements in one or both rotational directions.

Continuing with FIG. 1, the powertrain system (20) may include an electronic control unit (ECU) (30) for controlling operation of the first prime mover (22), the second prime mover (26), the main clutch (28), and the hybrid transmission (24). In a particular configuration, the ECU (30) includes a programmable digital computer that is configured to receive various input signals, including without limitation, the operating speeds of the first prime mover (22) and the second prime mover (26), the transmission input speed, the selected transmission ratio, the transmission output speed and vehicle speed, and then processes these signals according to logic rules to control operation of the powertrain system (20). For example, the ECU (30) may be programmed to deliver fuel to the first prime mover (22) when the first prime mover functions as an internal combustion engine. To support this control, each of the first prime mover (22), the second prime mover (26), the main clutch (28), and the hybrid transmission (24) may include its own controller (32, 33, 34, and 36), respectively. However, it will be appreciated that the present system and method are not limited to any particular type or configuration of ECU (30), controllers (32, 33, 34, and 36), or to any specific control logic for governing operation of the hybrid powertrain system (20).

In the exemplary embodiment illustrated in FIG. 1, the powertrain system (20) also includes at least one energy storage device (38A, 38B) for providing energy to operate the first and second prime movers (22, 26). For example, an energy storage device (38A), which is in fluid communication with the first prime mover (22), may contain a hydrocarbon fuel when the first prime mover (22) functions as an internal combustion engine. In another example, the energy storage device (38B) may include a battery, a bank of batteries, or a capacitor when the second prime mover (26) functions as an electric motor/generator. When so configured, the electric motor/generator (26) may be provided in electrical communication with the electrical storage device (38B) through a drive inverter (39), as is known in the art. Alternatively, the energy storage device (38B) may function as a hydraulic accumulator when the second prime mover (26) functions as a hydraulic motor/pump.

According to one exemplary embodiment, the hybrid transmission (24) is coupled to the output of the first prime mover (22) by a main synchronizing clutch (28), which is coupled to the first prime mover (22). Similarly, the hybrid transmission (24) is coupled to the second prime mover (26). According to one exemplary embodiment, both the first prime mover (22) and the second prime mover (26) may drive the hybrid transmission (24) independently or simultaneously. According to one exemplary embodiment, the hybrid transmission (24) may include any number of gear sets configured to allow independent and simultaneous drive of the transmission by the first (22) and the second (26) prime movers respectively including, but in no way limited to, a planetary gear set (not shown). Additionally, the hybrid transmission (24) may include a transmission input shaft that leads to a multi-ratio transmission. The multi-ratio transmission may include a number of interchangeable gear ratios, as found in any number of change-gear transmissions known in the art, or may include a less traditional power transmission system, such as a continuously variable transmission ("CVT").

As shown, the ECU (30) may be controllably coupled to the hybrid transmission to receive and interpret a number of torque, inertia, and speed inputs to determine transmission shift points and to issue shift commands based on a comparison of the transmission turbine speed to the determined shift points. According to one exemplary embodiment, the illustrated ECU (30) includes a microprocessor-based computer programmed with a number of non-fuzzy logic rules and membership functions that determine transmission shift points based on a number of conditions including, but in no way limited to, torque, inertia, and speed inputs. Additionally, the ECU (30) may include a shift logic module configured to issue up shift and downshift signals upon comparing existing transmission turbine speeds with the determined shift points, and a control module for executing the clutch operations associated with the desired range shift. Further details of the operation methods of the ECU (30) will be described in further detail below.

As previously mentioned, traditional vehicles that incorporate a single prime mover may include a gear shift schedule map to determine the shift points that will provide a desired mixture of fuel economy and acceleration. However, the dynamic establishment of a desired shift point strategy is somewhat convoluted by the use of a plurality of prime movers in a more complex hybrid powertrain system (20). Hybrid powertrain systems receive torque inputs from at least two available power sources. The variable amount and combinations of torque and power that may be provided by the plurality of prime movers in a hybrid powertrain system (20) make it infeasible to use a gear shift schedule map. Consequently, the present system and method use non-fuzzy logic to determine appropriate shift points based upon a number of inputs and vehicle conditions. Details of the exemplary system and method that may be incorporated by an ECU (30) for determining shift points in a hybrid vehicle will be given below.

Figure 2:
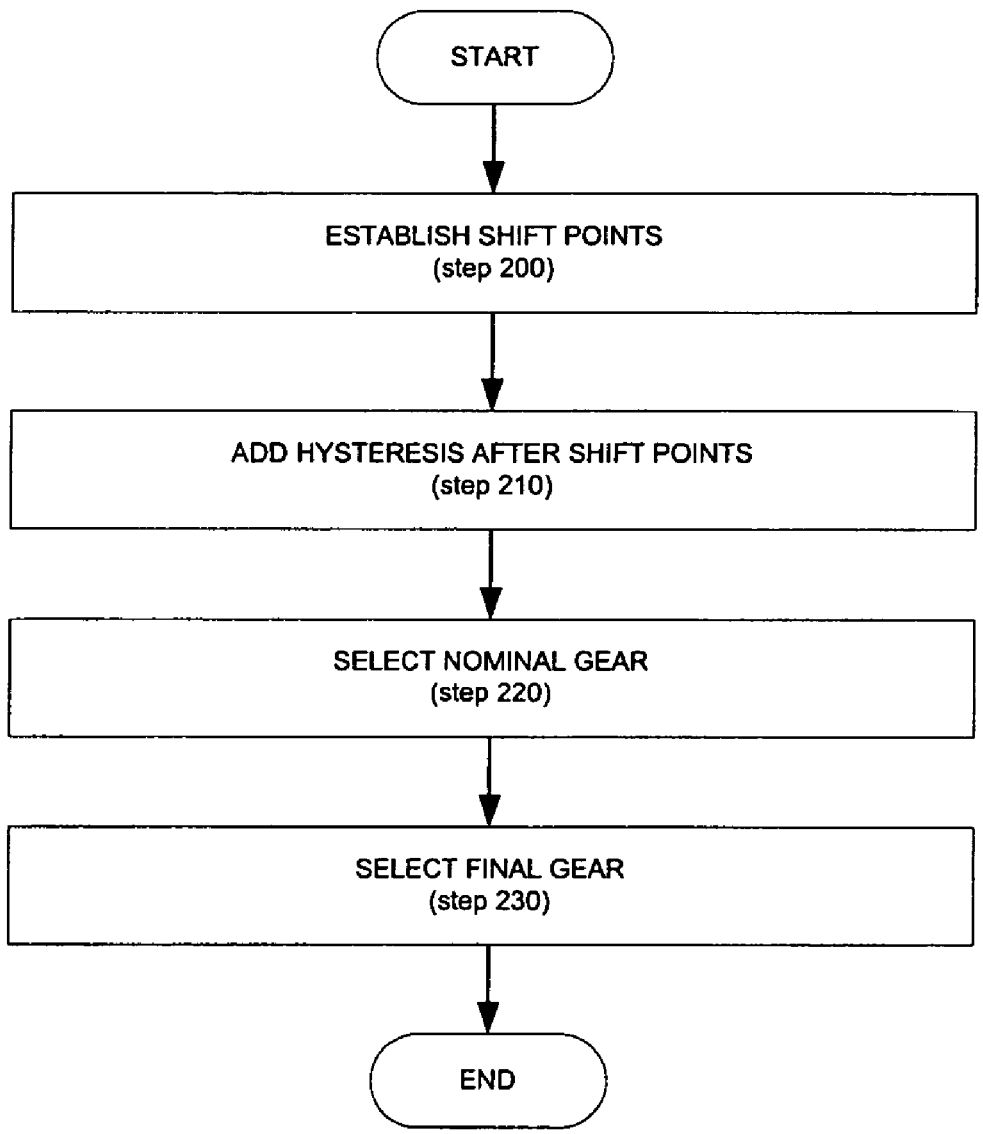
FIG. 2 is a flow chart illustrating a method for determining automatic transmission shift points in a hybrid vehicle, according to one exemplary embodiment.

FIG. 2 illustrates an exemplary method incorporated by an ECU (30) for determining a number of shift points and executing timely shifts in a hybrid vehicle, according to one exemplary embodiment. As shown, the present exemplary method begins by first establishing a number of shift points based on a plurality of data and the application of non-fuzzy logic to the data (step 200). Once the shift points have been established, hysteresis is added after the identified shift points (step 210). Then, as illustrated in FIG. 2, based at least in part on a number of operating conditions and the application of non-fuzzy logic, a nominal gear is selected (step 220) and a final gear is selected based on a triggering condition (step 230). According to one exemplary embodiment the above-mentioned exemplary method for determining a number of shift points and executing timely shifts in a hybrid vehicle are repeatedly performed to coincide with changing vehicle operation conditions. Further details of the above-mentioned exemplary method will now be provided with reference to FIGS. 3 and 4.

Figure 3:
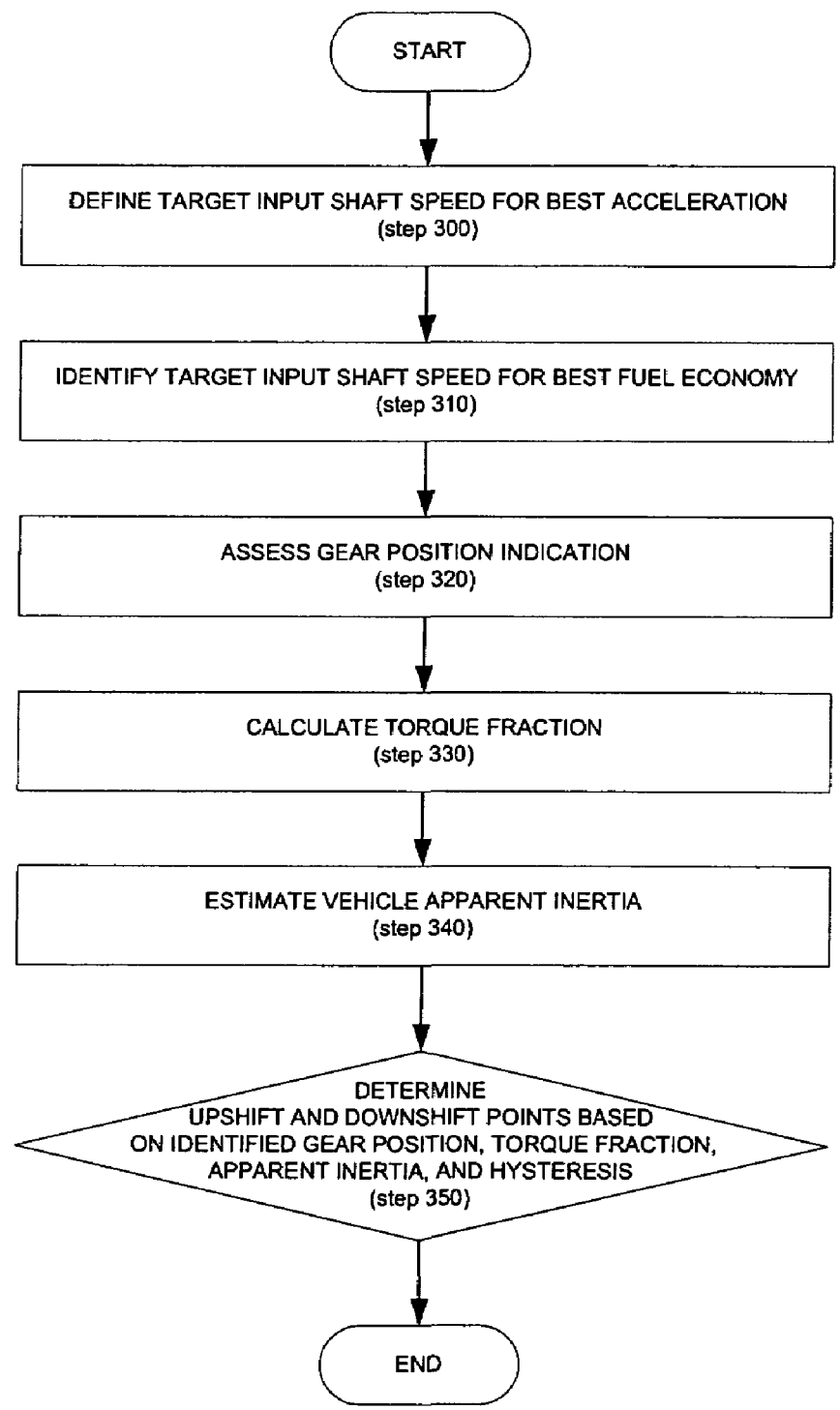
FIG. 3 is a flow chart illustrating a method for evaluating driver intent and scaling shift points in response to the driver intent, according to one exemplary embodiment.

As mentioned, the present exemplary method for determining shift points and executing timely shifts in a hybrid vehicle begins by first establishing a number of shift points based on the accumulation of data and the application of the data to non-fuzzy logic (step 200). FIG. 3 illustrates an exemplary method for determining the shift points, according to one exemplary embodiment. As illustrated in FIG. 3, the exemplary method for determining shift points in a hybrid vehicle begins by first defining a target input shaft speed for best acceleration (step 300). Traditionally, high input shaft speeds provide the best acceleration. According to the present exemplary embodiment, the target input shaft speed for best acceleration is determined and can be produced by input from an internal combustion engine, input from an alternative fuel source such as a fuel cell or a battery providing electricity to an electric motor, or by input from a combination of an internal combustion engine and an alternative fuel source.

Figure 4:
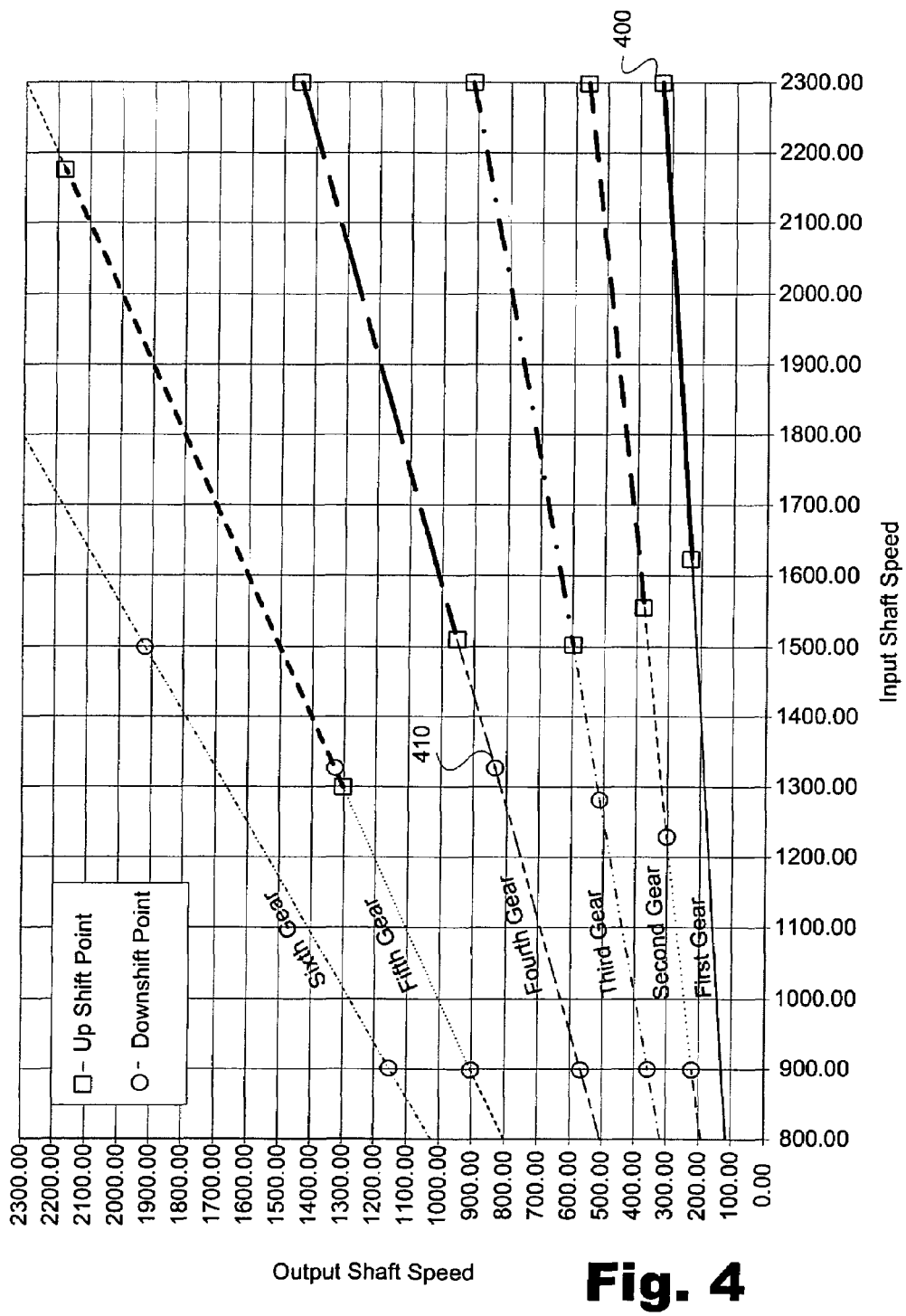
FIG. 4 is a chart illustrating a shift point strategy implemented in a hybrid vehicle, according to one exemplary embodiment.

According to one exemplary embodiment, the input shaft speeds for the shift points of each gear of the present hybrid transmission (24; FIG. 1) for best acceleration (the high point) are determined by analyzing a curve of the combined maximum torque of a first (22; FIG. 1) and a second (26; FIG. 1) prime mover as a function of speed. This curve is then plotted for each gear ratio to get the effective max torque of the hybrid drive system at the transmission output shaft as a function of speed. According to this exemplary embodiment, the curve is then analyzed so that when operating according to a condition that provides the best acceleration, the hybrid transmission is maintained in gear until the torque in the current gear is near the same value as the torque would be in the next gear to be selected. If that is not possible, a high input shaft speed point providing the best acceleration is chosen as high as possible within mechanical limits of the hybrid transmission (24; FIG. 1) and the driveline, while maintaining driver ergonomics (noise) at appropriate levels. For example, as illustrated in FIG. 4, the first gear has an up shift point (400) representing an upper mechanical limit of the hybrid transmission. Input shaft speeds in excess of the upper mechanical limit may result in damage to the hybrid transmission (24; FIG. 1).

Additionally, according to the exemplary method illustrated in FIG. 3, the present system identifies the target input shaft speed that will produce the best fuel economy (step 310). According to the present exemplary embodiment, the target input shaft speed for best fuel economy may be determined from an internal combustion engine, from an alternative fuel source such as a fuel cell or a battery providing electricity to an electric motor, or from a combination of an internal combustion engine and an alternative fuel source.

According to one exemplary embodiment, maximized fuel economy of the hybrid vehicle may be provided when the first prime mover (22), embodied as an internal combustion engine, operates at steady state sufficient to prevent stalling of the engine. Consequently, the target input shaft speed for best fuel economy may be reached as a result of a combination of inputs from both the first prime mover (22; FIG. 1) operating as an internal combustion engine and a second prime mover (26; FIG. 1) utilizing an alternative fuel source such as an electric motor. According to this exemplary embodiment, the target input shaft speed for best fuel economy may be calculated as a ratio of power provided by the first prime mover (22; FIG. 1) such as an internal combustion engine operating at a steady state, while increases and decreases in input shaft speed are provided by varying the power input of a second prime mover (26; FIG. 1) in the form of an electric motor.

While maximum fuel efficiency may be achieved by operating the first prime mover (22; FIG. 1) and the second prime mover (26; FIG. 1) at the lowest operational speeds possible, the shift point for best fuel economy is set such that the vehicle has the ability to continue to accelerate to the next gear in the hybrid transmission (24; FIG. 1). According to one exemplary embodiment, the target input shaft speed for best fuel economy may be adjusted based on the fuel economy curve for the first prime mover (22; FIG. 1) operating as an internal combustion engine and the efficiency curve of the second prime mover (26; FIG. 1) operating as a motor. In most cases, both systems exhibit best fuel economy at the lowest possible operational speeds. Additionally, according to one exemplary embodiment, the shift points established for the best fuel economy and the best acceleration may be varied slightly from the absolute maximum values to enhance operator feel on a variety of grades. This may be a matter of vehicle application and target performance requirements. According to one exemplary embodiment, the up shift points (400) and the downshift points (410) illustrated in FIG. 4 may be modified to enhance an operator feel.

Regardless of the prime mover combinations that are utilized to form the extremes of fuel economy and acceleration, the target input shaft speed for the best acceleration and the target input shaft speed for the best fuel economy establish a ceiling and a floor value, respectively, for the resulting shift points. Once these extreme shift point parameters have been determined, a number of conditions that indicate the intent of a driver are evaluated to vary the location of the resulting shift points, thereby allowing the vehicle to provide a safe, efficient, and reactive ride.

As illustrated in FIG. 3, the shift points may be scaled from the extreme parameters by analyzing a gear position indication selection (step 320). According to one embodiment, if the gear position indication is placed in a general drive (D) or overdrive position, it is assumed that fuel efficiency is of interest to the driver and acceleration and/or torque production may be less of a priority. Consequently, according to one exemplary embodiment, detection of the gear position indication in the general drive (D) or overdrive (OD) position will indicate a desire to scale the resulting shift points towards the lower input shaft speeds identified as providing the best fuel economy. In contrast, a gear position indication that is in a relatively lower position than drive (D) or overdrive (OD), such as low (L), or a specific lower gear (1, 2, 3), may indicate that the user desires increased acceleration and torque availability. Consequently, a gear position indication that is in a low position than merely drive (D) or overdrive (OD) will be interpreted as a desire to scale the shift points towards a higher input shaft velocity to allow for the production of more acceleration and/or torque, at the cost of possible fuel efficiency.

Another condition that may be examined to scale the location of the resulting shift points is the torque fraction currently used by the vehicle (step 330). According to one exemplary embodiment, the torque fraction of the vehicle is defined as the torque amount commanded divided by the amount of torque available in the present gear condition. According to this definition of the torque fraction, possible torque inputs provided by either or both of the first and second prime movers are evaluated to determine the amount of torque available in the present gear position. More specifically, the ECU determines the current gear position of the transmission and multiplies the gear position by the potential torque input provided by both the first prime mover (22; FIG. 1) and the second prime mover (26). According to this exemplary embodiment, if the user of the vehicle is requesting a large portion of the torque available, the request is interpreted as a desire for a high acceleration rate. Consequently, a torque fraction near 1.0 will cause the resulting shift points to be scaled towards the higher input shaft velocities.

According to one exemplary embodiment, the torque fraction is used to compute a torque command factor, which may subsequently be used to scale the shift points. Implementation of the torque command factor includes creating a factor between zero and one, depending on the torque fraction, where one represents max acceleration shift point selection and zero represents best MPG shift point selection. This factor is based on the ratio of the current torque being requested to the max torque available and on the current vehicle apparent inertia. The torque command factor is then used to dynamically scale the shift points along with the other factors being analyzed.

In addition to the above-mentioned conditions, the present exemplary system estimates the apparent inertia of the vehicle (step 340) to further scale the resulting shift points. Heavier loads having high vehicle inertia typically require higher shift points to maintain a desired velocity. According to one exemplary embodiment, the vehicle apparent inertia may be calculated as the transmission output shaft torque divided by the vehicle acceleration. Transmission output shaft torque may be determined according to any number of exemplary methods. According to one exemplary embodiment, the output shaft torque may be determined by adding the output torque of both the first prime mover (22; FIG. 1) and the second prime mover (26; FIG. 1). In order to obtain the torque of the first prime mover (22; FIG. 1), the throttle opening, typically indicating the state of the engine, may be detected by a throttle sensor. The throttle opening may then be compared to an engine rotating speed, and compared by the ECU (30; FIG. 1) to an output power characteristic map to ascertain the torque of the first prime mover (22; FIG. 1). Similarly, to determine the output torque of the second prime mover (26; FIG. 1), the energy input into the second prime mover may be obtained and then compared to an output characteristic map.

Similarly, any number of known methods may be used to determine the acceleration of the vehicle. According to one exemplary embodiment, the vehicle acceleration is determined by first measuring the transmission output shaft speed of the hybrid transmission (24; FIG. 1). According to one exemplary embodiment, the velocities of the present hybrid system may be obtained with conventional electrical transducers such as potentiometers, thermistors, and magnetic speed pickups. These inputs may then be used by the ECU (30; FIG. 1) to generate a numeric value for the velocities of the present hybrid system. Once the velocity of the transmission output shaft is measured, the acceleration is calculated as the time derivative of the measured output velocity. The acceleration and the torque may then be used to determine the apparent inertia of the vehicle. Prior to the use of the acceleration and the torque data to determine the apparent inertia of the vehicle, the data may be digitally filtered, according to one embodiment, to remove noise effects. The apparent inertia may be used to indicate when shift points should be raised due to conditions surrounding the vehicle such as, but in no way limited to, large loads, poor road conditions such as mud, or steep inclines. According to one exemplary embodiment, the vehicle apparent inertia works like a multiplier on the torque fraction and scales the vehicle to higher shift points for higher vehicle weights and lower shift points for empty vehicles.

Continuing with FIG. 3, once the identified gear position, the torque fraction, and the apparent inertia are collected, up shift and downshift points may be determined for current operating conditions (step 350). According to one exemplary embodiment, the two extremes established by the target input shaft speeds for best acceleration and best fuel economy are scaled according to the inertia of the vehicle and the performance desire of the vehicle operator as manifest by the torque fraction being used and the identified gear position.

In addition to scaling the shift points due to the identified gear position, the torque fraction, and the apparent inertia, the shift points may also be scaled based on a hysteresis (step 210). Specifically, a speed offset is added to each up shift point and subtracted from each downshift point during execution of a gear change. This calculated speed offset is initialized immediately at the start of a shift and ramps down at a calculated rate. The shift hysteresis is configured to avoid limit cycles.

FIG. 4 is a chart illustrating the minimum and maximum up shift points and downshift points for each gear plotted as hybrid transmission input shaft speed against hybrid transmission output shaft speed. As shown in FIG. 4, the shaft speeds that correspond with an up shift and a downshift in the hybrid vehicle may vary widely for each available gear. Consequently, the scaling factors mentioned above may have a large impact on the fuel economy and the acceleration characteristics of the hybrid vehicle. Additionally, as illustrated in FIG. 4, the up shift and downshift points may be selected based on the gear ratios between the current gear in operation, the one gear higher for up shift and the one gear lower for the downshift point. According to this exemplary embodiment, the gear ratios between the current gear and the surrounding gears are considered so that gear engagement may be performed when the input shaft speeds and the output shaft speeds are relatively close, thereby substantially reducing wear on the gears during the execution of an up shift or a downshift.

Returning again to FIG. 2, once the shift points are dynamically established, according to the above-mentioned method, the hybrid vehicle selects a nominal gear for operation (step 220). According to one exemplary embodiment, the nominal gear is selected based on the transmission output shaft speed. Once the transmission output shaft speed is detected, a gear is selected that allows for some headway before requiring a downshift under the current conditions, according to the established shift point strategy.

With the nominal gear selected (step 220), the final gear may be selected based on the established shift points strategy. According to one exemplary embodiment, a positive mode of shifting is used where the up shifts and the downshifts from the nominal gear are performed in the hybrid transmission (24; FIG. 1) according to the established shift points.

According to one exemplary embodiment, the present method is continually performed in a hybrid vehicle to dynamically update the shift points strategy. Further, the present methods may be performed during an actual shift so that if excessive deceleration or acceleration occurs, the gear command will be updated to reflect a new operator preference.

The present exemplary system and method have been particularly shown and described with reference to the foregoing embodiments, which are merely illustrative of the best modes for carrying out the system and method. It should be understood by those skilled in the art that various alternatives to the embodiments of the system and method described herein may be employed in practicing the system and/or method, without departing from the spirit and scope thereof as defined in the following claims. It is intended that the following claims define the scope of the system and method and that the systems and methods within the scope of these claims and their equivalents be covered thereby. This description of the system and method should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A method for determining a shift point strategy, comprising:
   providing at least two power sources;
   selectively coupling a hybrid vehicle transmission having an input shaft to said at least two power sources, said hybrid vehicle transmission receiving power from said power sources;
   defining a speed of said transmission input shaft to promote an acceleration as compared to a fuel economy;
   defining a speed of said transmission input shaft to promote said fuel economy as compared to said acceleration;
   determining driver intent to promote either of said acceleration and said fuel economy; and
   setting a shift point based, in part, on at least said determining step, wherein said shift point is variable based on said determining step; and
   wherein said setting of said shift point comprises setting an unscheduled up shift point and an unscheduled downshift point for an engaged gear of said hybrid transmission; and
   wherein said determining driver intent to promote either of said acceleration and said fuel economy includes assessing a gear position indication to promote one of said acceleration and said fuel economy.

2. The method as recited in claim 1, wherein said determining step comprises using driver demand torque as a fraction of total available torque.

3. The method as recited in claim 2, wherein said total available torque comprises a sum of available torque from said at least two power sources.

4. The method as recited in claim 1, further comprising:
determining an apparent inertia of a vehicle; and
using said determined vehicle apparent inertia as an indicator of a need to scale at least one shift point.

5. The method as recited in claim 4, wherein said determining an apparent inertia of a vehicle comprises:
measuring an output shaft torque of said hybrid vehicle transmission;
determining an acceleration of said vehicle; and
dividing said output shaft torque by said vehicle acceleration.

6. The method as recited in claim 1, further comprising the step of adding hysteresis after shifts to minimize a need for limit cycles.

7. The method as recited in claim 1, wherein said setting a shift point based in part on at least said determining step comprises setting an up shift point and a downshift point for each gear in said hybrid transmission.

8. A method for determining a shift point strategy, comprising:
providing at least a first power source and a second power source, wherein said first power source is an internal combustion engine;
selectively coupling a hybrid vehicle transmission having an input shaft to said at least two power sources, said hybrid vehicle transmission being configured to selectively receive power from said at least first and second power sources;
defining a speed of said transmission input shaft to promote an acceleration as compared to a fuel economy;
defining a speed of said transmission input shaft to promote said fuel economy as compared to said acceleration;
determining driver intent to promote either of said acceleration and said fuel economy, said driver intent being determined using driver demand torque as a fraction of total available torque, an apparent inertia of a vehicle, and a transmission gear position indication; and
setting a shift point based, in part, on at least said determining step, wherein said shift point is variable based on said determining step; and
wherein said setting of said shift point comprises setting an unscheduled up shift point and an unscheduled downshift point for an engaged gear of said hybrid transmission.

9. The method as recited in claim 8, further comprising adding hysteresis after shifts to minimize a need for limit cycles.

10. The method as recited in claim 8, wherein said setting a shift point based in part on at least said determining step comprises setting an up shift point and a downshift point for each gear in said hybrid transmission.

11. A method for operating a hybrid vehicle comprising:
establishing a shift point strategy, wherein said establishing a shift point strategy includes providing at least two power sources, selectively coupling a hybrid vehicle transmission having an input shaft to said at least two power sources, said hybrid vehicle transmission receiving power from at least one of said power sources, defining a speed of said transmission input shaft to promote an acceleration as compared to a fuel economy, defining a speed of said transmission input shaft to promote said fuel economy as compared to said acceleration, determining driver intent to promote either of said acceleration and said fuel economy, and setting a shift point based, in part, on at least said determining step, wherein said shift point is variable based on said determining step;
determining an intermediate gear that falls within said shift point strategy; and
selecting said intermediate gear;
wherein said determining driver intent to promote either of said acceleration and said fuel economy includes assessing a gear position indication to promote one of said acceleration and said fuel economy; and
wherein said setting of said shift point based, in part, on at least said determining step comprises setting an unscheduled up shift point and an unscheduled downshift point for an engaged gear of said hybrid transmission.

12. The method for operating a hybrid vehicle of claim 11, wherein said determining step comprises using driver demand torque as a fraction of total available torque.

13. The method for operating a hybrid vehicle of claim 12, wherein said total available torque comprises a sum of available torque from said at least two power sources.

14. The method for operating a hybrid vehicle of claim 11, further comprising:
determining an apparent inertia of a vehicle; and
using said determined vehicle apparent inertia as an indicator of a need to scale at least one shift point.

15. The method for operating a hybrid vehicle of claim 14, wherein said determining an apparent inertia of a vehicle comprises:
measuring an output shaft torque of said hybrid vehicle transmission;
determining an acceleration of said vehicle; and
dividing said output shaft torque by said vehicle acceleration.

16. The method for operating a hybrid vehicle of claim 11, further comprising the step of adding hysteresis after shifts to minimize a need for limit cycles.

17. The method for operating a hybrid vehicle of claim 11, wherein said setting a shift point based in part on at least said determining step comprises setting an up shift point and a downshift point for each gear in said hybrid transmission.

18. A system for determining a shift point strategy in a hybrid transmission having a plurality of prime movers selectively coupled to an input shaft comprising:
a control unit configured to define a speed of said hybrid transmission input shaft to promote an acceleration as compared to a fuel economy, define a speed of said transmission input shaft to promote said fuel economy as compared to said acceleration, determine driver intent to promote either of said acceleration and said fuel economy based in part at least on driver demand torque as a fraction of total available torque, and set a shift point based in part on at least said determining step, where said shift point is variable based on said determining step; and
wherein said shift point comprises an unscheduled up shift point and an unscheduled downshift point for an engaged gear of said hybrid transmission.

19. The system of claim 18, wherein said control unit is further configured to determine driver intent based at least in part on an automatic gear position indicator.

20. The system of claim 18, wherein said control unit is further configured to determine an apparent inertia of a vehicle, and use said determined vehicle apparent inertia as an indicator of a need to scale at least one shift point.

* * * * *